Nov. 6, 1951 — W. C. BLINN ET AL — 2,573,686

TEMPERATURE INDICATING DEVICE

Filed Jan. 8, 1948

INVENTORS
WELFORD C. BLINN
WILLIAM R. BAILEY

BY
ATTORNEY

Patented Nov. 6, 1951

2,573,686

UNITED STATES PATENT OFFICE 2,573,686

TEMPERATURE INDICATING DEVICE

Welford C. Blinn, Arlington, Va., and William R. Bailey, Chevy Chase, Md.

Application January 8, 1948, Serial No. 1,208

6 Claims. (Cl. 73—365)

(Granted under the act of March 3, 1883, as amended April 30, 1928; 370 O. G. 757)

This invention relates to improvements in indicating devices, especially for the purpose of indicating atmospheric temperatures although, conceivably, the principles of its structure and operation could be adapted to indicating the temperatures of other media.

A particular use to which the invention is intended to be put is to indicate the temperatures of storage areas aboard ship and of the upper atmospheres in naval stores or the like where temperature control either alone or in conjunction with humidity readings is an important factor. Although the immediately following description is confined to this specialized use, this is done solely for the purpose of illustration and is not to be regarded as a limitation.

Referring then to said specialized use, it has been found that a thermometer is needed in combination with a humidity indicating device such, for example, as disclosed in the application for United States patent filed by Welford C. Blinn and William R. Bailey, April 15, 1947, Serial No. 741,658. However, commonly known fluid-in-glass thermometers are not only currently difficult to obtain but are notoriously inaccurate, it being rather the rule than the exception to observe variations in temperature readings in each of several such identical thermometers in the same ambient temperature. An additional objection to fluid-in-glass thermometers is their slowness in arriving at indications, one to two minutes generally elapsing before a change from any given temperature is fully shown thereby.

These circumstances have led to the experimentation with and development of a reliable rapid-indicating and, incidentally, comparatively inexpensive temperature indicating device, based to some extent on its humidity indicating prototype in the application aforesaid. Being of that general character, the instant invention comprises a bonded plastic and metal combination in the structure of the temperature indicating element, in contradistinction to the bonded plastic combination in the pointer of the application, which element is anchored at one end and has its free end arranged to traverse a calibrated scale, wherein it too functions as a pointer.

A survey of the pertinent prior art will disclose numbers of temperature indicating devices distinguishing from the fluid-in-glass type by comprising movable bimetallic pointers. The use of the plastic and metal combination disclosed herein is a studied improvement in pointers of that kind. As far as the working principle is concerned, the bimetallic and plastic-metal types are alike in that the difference in the coefficients of expansion of the bonded materials produces a swinging of the pointer.

Bimetallic thermometric pointers are regarded as inadequate for indicating temperatures over the various Fahrenheit and centrigrade ranges in which the scales will be graduated for use in the five temperature zones of the earth. The reasons for this inadequacy are, first, that a bimetallic pointer of a length sufficient to traverse a scale at its free end, calibrated in readily readable divisions for any of those zones will exhibit inaccuracies due to gravitational bending, particularly when flexed to reach the extremities of the scale.

Second, the differential between metals most commonly used in thermometers and having the most widely separated coefficients of expansion, would produce approximately only one-twelfth the motion produced by the plastic and metal combination herein contemplated, and this limitation if imposed on a two inch bimetal pointer, which is the approximate length of the plastic and metal pointer, would require confining the necessarily accompanying thermometer scale to such a small size that it would ordinarily be difficult to read.

Inasmuch as the device is intended to indicate rapidly the temperature of the atmosphere or other medium and not its humidity content, the plastic component of the plastic-metal pointer is composed of a non-hygroscopic thermoplastic chosen from the vinyl series of which polystyrene was found to be the most satisfactory. The component bonded to the polystyrene is a ferrous metal. From the foregoing premises it can be understood that one of the objects of the invention is to provide a temperature indicating device wherein the temperature-sensitive pointer is composed of laminae of such materials as will insure its lightness and consequent rapidity and accuracy of indication throughout a given temperature scale, even when made of such a length that permits graduating the scale in normally easily readable divisions.

Another object of the invention is to provide a temperature indicating device wherein the pointer comprises a non-hygroscopic thermoplastic and metal combination.

Another object is to provide a more quickly temperature indicating device than heretofore available in the art.

A further object of the invention is to provide a temperature indicating device wherein the choice of the plastic and metal combination for the pointer insures uniform ratios of bending of the laminae in each of the two directions of flexure toward the extremities of the scale.

Other objects and advantages of the invention will appear in the following specification, reference being had to the accompanying drawings in which.

Figure 1:
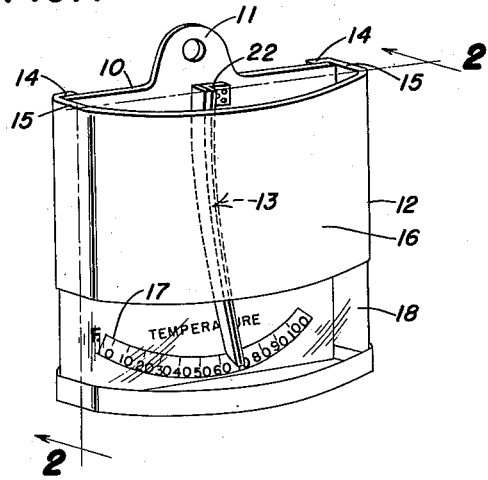
Fig. 1 is a perspective view of the improved temperature indicating device, illustrating the general characteristics of the invention.

In carrying out the invention, provision is made of a base 10 which is shown as of a generally rectangular shape. This, however, does not have to be adhered to, and in practice may be made of any configuration desired. It is preferably, but not necessarily, made of non-hygroscopic material. A perforated tab 11 provides for hanging the device on a support, for example, within the confines of an enclosure the atmospheric temperature of which must be kept under observation.

An encasement 12 provides a guard in front of a pointer 13. As in the instance of the base, the encasement may have any desired configuration other than shown. For the purpose of this illustration, the encasement is fastened at two of its sides to the base as at 14, thence is extended forwardly at 15 curved across the front as at 16. The encasement thus defines an open-ended chamber in which the pointer can swing at its free end without obstruction, over a scale 17 carried by the base 10. The encasement is opaque but has a transparent band 18 through which the scale and the free end of the pointer are visible.

Figure 3:
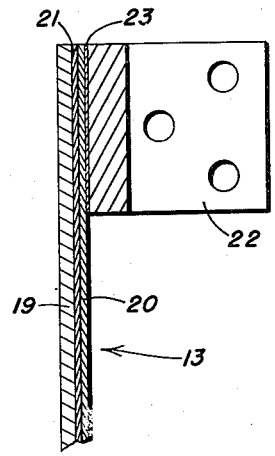
Fig. 3 is an enlarged detail view of the pointer mounting, a part of the pointer being shown in section.

The pointer 13 comprises laminae 19 and 20 (Fig. 3), respectively consisting of a non-hygroscopic plastic and a ferrous metal. It is the sole moving part of the device, and constitutes both the thermo-sensitive element as well as the pointer. A species of thermoplastic which proved eminently satisfactory for the instant purpose is polystyrene. A species of ferrous metal also found satisfactory is stainless steel. These laminae are bonded together face to face by an adhesive 21 which remains flexible after it has set. A species of adhesive which is suitable for the purpose is a rubbery type of non-hardening cement with a low water absorption index which is chemically inert and therefore lends itself to the instant use, the latter property being desirable from the standpoint of inhibiting the migration of the chemical constituents of the plastic lamina.

Experimentation with various thicknesses of plastic and metal combinations have shown that a two-to-one ratio produces the required result. More specifically, the optimum thickness for the polystyrene was settled at from two to five thousandths of an inch (.002" to .005") while the optimum thickness for the stainless steel was settled at one thousandth of an inch (.001"). The length of the pointer is approximately two inches (2"), the amplitude of swinging motion of the pointer on the foregoing premise being one and one-half inches (1½") through a 100° F. change in temperature. On the basis of this amount of bending movement, the scale can be made large enough, i. e. the calibrations can be spaced far enough apart, to insure easy reading at average distances.

It will be remembered that the extreme lightness of the pointer, due to the thin materials in it, enables lengthening the pointer to such a radial position whereat a sizeable scale can be calibrated, and this with virtually no danger of false readings at the extremities of flexure due to gravitational pull.

The pointer 13 is attached to a mount 22 by means of the adhesive 23 which should be of a character to hold the pointer firmly. Riveting can be resorted to, but there is no particular preference as to how the pointer is secured to its mount. The latter, in turn, is affixed to the base 10 in the substantially mid-position shown, so that the pointer hangs vertically of the device and centrally of the scale at the middle of the temperature range for which the scale is calibrated.

Figure 2:
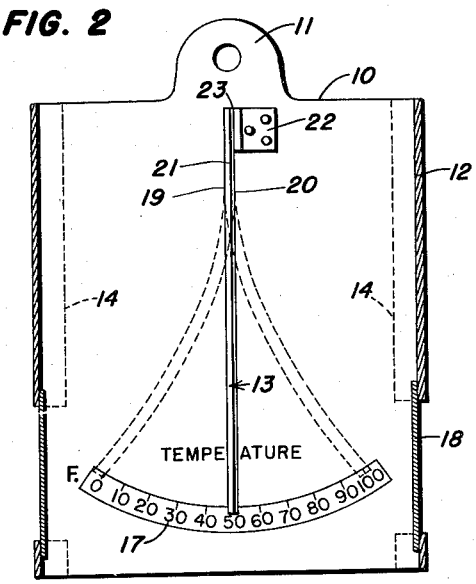
Fig. 2 is a vertical section taken on the line 2—2 of Fig. 1, parts being shown in elevation.

In operation the pointer 13 bends either to the right or left (Fig. 2 dotted lines) when influenced by a rise or fall of the ambient atmospheric temperature. The coefficients of thermal expansion of the plastic-metal laminae for degree centigrade per centimeter is $7 \times 10^{-5}$ for the polystyrene and $1 \times 10^{-5}$ for the steel, indicating that the plastic component expands a greater linear distance for each degree of rise in temperature than does the metal component. By the same token, the plastic component contracts more rapidly than does the metal component as the temperature falls.

In conclusion it is desired to state that the foregoing experimentation included the use of non-ferrous metals, such as bronze, copper and aluminum in combination with such other plastics in the vinyl series as vinyl chloride and vinyl chloride acetate. Polystyrene, however, was found most satisfactory, due to its stiffness in very thin sections which facilitated its pointer-actuating quality under the influence of temperature changes. Another advantage of the polystyrene is its high softening point.

The invention herein described may be manufactured and used by or for the Government of the United States of America for governmental purposes without the payment of any royalties thereon or therefor.

We claim:

1. A temperature indicating device comprising a thermo-sensitive element consisting of a polystyrene strip from .002" to .005" thick, a stainless steel strip approximately .001" thick and a pliable adhesive flexibly bonding said strips face to face to constitute a pointer, an encasement full-length of the pointer to guard it against mechanical injury principally from the sides and front and consisting of side portions and a front portion of which front portion at least a part is transparent crosswise of the pointer, and a base to which the side portions of the encasement and one end of the pointer are fastened to establish a common support and to space the encasement from the pointer, said base maintaining the registration of the transparent part of the encasement with the free end of the pointer and having a graduated zone traversible by said free end and visible through said transparent part.

2. A temperature indicating device comprising a thermo-sensitive element consisting of a polystyrene strip from .002" to .005" thick, a steel strip approximately .001" thick and a pliable adhesive flexibly bonding said strips face to face to constitute a pointer, an encasement for the pointer to guard it against mechanical injury principally from the sides and front and consisting of side portions and a front portion, said front portion having a window through which the pointer can be seen, and a base to which the side portions of the encasement and one end of the pointer are fastened to establish a common support and to space the encasement from the pointer, said base maintaining the registration of the window of the encasement with the free end of the pointer and having a graduated zone traversible by said free end and also visible through said window.

3. The combination with a base including a temperature scale, of a combined thermo-sensitive element and pointer comprising a flexible laminated member secured at one end thereof to said base and having its other end free and movable across said temperature scale, said laminated member comprising a lamina of non-hygroscopic plastic selected from the group consisting of polystyrene, vinyl chloride and vinyl chloride acetate, and a lamina of metal secured in face to face relation with said lamina of plastic.

4. The combination defined in claim 3 wherein said plastic lamina is polystyrene having a thickness of from .002" to .005", and said lamina of metal is stainless steel having a thickness of about .001".

5. The combination defined in claim 4 wherein a pliable adhesive secures said laminae together.

6. The combination defined in claim 3 wherein a pliable adhesive secures said laminae together.

WELFORD C. BLINN.
WILLIAM R. BAILEY.

REFERENCES CITED

The following references are of record in the file of this patent:

UNITED STATES PATENTS

| Number | Name | Date |
|---|---|---|
| 798,413 | Howard | Aug. 29, 1905 |
| 1,762,859 | Gerhard | June 10, 1930 |
| 2,013,119 | Warth | Sept. 3, 1935 |
| 2,470,761 | Delorme et al. | May 24, 1949 |